Jan. 13, 1970  KINZO NAKAMURA  3,489,938
COIL RETAINER FOR AN IRON CORE OF ROTARY MACHINES OF
THE LAMINATED IRON CORE TYPE
Filed Jan. 13, 1969
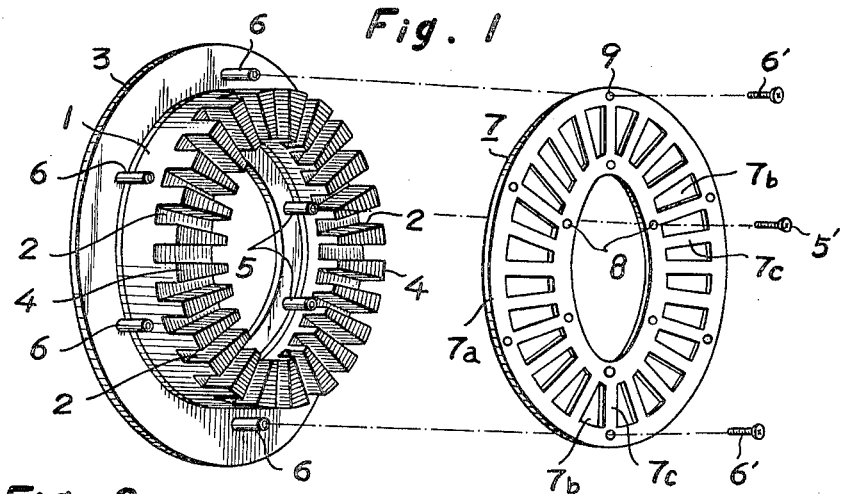
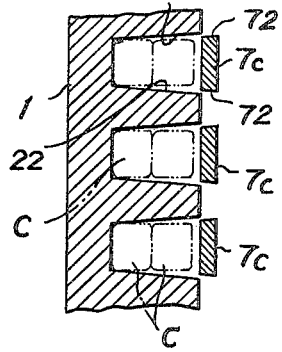
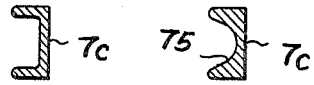
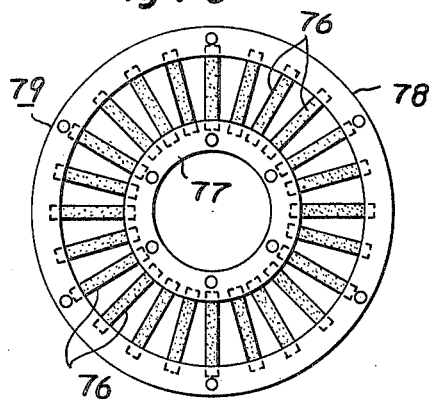
*INVENTOR.*
KINZO NAKAMURA United States Patent Office 3,489,938
Patented Jan. 13, 1970

3,489,938
COIL RETAINER FOR AN IRON CORE OF ROTARY MACHINES OF THE LAMINATED IRON CORE TYPE
Kinzo Nakamura, 41–2, Jubu Umadashi-machi, Ishikawa-ken, Nanao-shi, Japan
Filed Jan. 13, 1969, Ser. No. 790,777
Int. Cl. H02k 3/48
U.S. Cl. 310—214                                   5 Claims

ABSTRACT OF THE DISCLOSURE

A coil retainer for an iron core of rotary machines of the laminated core type which comprises a discal core keep plate adapted to be mounted on the core for keeping turns of insulated coil in open slots formed radially on one side of a laminated core for rotary machines made by winding and laminating metal strips in a hollow columnar shape. The coil retainer can positively retain turns of insulated coil in the slots by eliminating individual rectangular coil keep plates that have hitherto been employed for retaining turns of insulated coils in the slots.

Background of the invention

In retaining turns of insulated coils mounted in slots of a core for rotary machines, it has hitherto been customary to employ wedges and insert same in engaging grooves formed in the side walls of the slots for providing cover to the openings of the slots so as to thereby hold the turns of insulated coil in place in the slots. However, this prior art method employing wedges has many disadvantages. The operation for inserting such wedges is very difficult to perform and requires no less labor than does the operation of mounting turns of insulated coils in the slots. When the wedges are inserted in the engaging grooves, there is the danger of wedges being brought into frictional engagement with the coil and damaging or lowering insulation of the latter. In order to avoid this problem, the portion of the coil which comes into engagement with the wedges must be protected by means of insulating paper, insulating cloth or the like. The provision of this reinforcement results in lowering of the space factor of the coils with respect to the slots. Thus, it becomes necessary to increase the depth of the slots and consequently to use a larger core in order to provide the slots of a capacity which is sufficiently large to hold turns of insulated coil therein.

Particularly, in the case of semi-closed slots, there is the increased danger of damaging insulation of coils because of the necessity to correcting irregularities in turns of insulated coils or to provide an ample space in the slots for inserting wedges therein.

Summary of the invention

The present invention provides a coil retainer for holding in place turns of insulated coils mounted in radially disposed open slots formed in a laminated core for rotary machines made by winding and laminating metal strip in a hollow columnar shape. The coil retainer embodying the invention comprises a discal coil keep plate which is formed with a number of rectangular coil keep members arranged radially and connected together as a unit at their inner end outer ends so as to be aligned with said open slots in the core for keeping turns of insulated coils in place in the slots. The discal coil keep plate can be removably connected to the core by bolts and screw, thereby increasing the efficiency of the operation of providing cover to slots in the core for positively retaining turns of insulated coil therein.

Objects of the invention

A principal object of the invention is to provide a coil retainer for a core of rotary machines of the laminated core type which can readily and positively provide cover to slots formed in a core for retaining turns of insulated coils therein, such coil retainer providing a high space factor to the turns of coils with respect to the slots and can be produced at low cost on a mass production basis, with utility in many applications.

Another object of the invention is to provide a coil retainer for a core of rotary machines of the laminated core type which comprises a discal coil keep plate formed with a number of rectangular coil keep members arranged radially and connected together as a unit so as to be aligned with and fitted in open slots formed in the core for keeping turns of insulated coils in place in the slots.

Still another object of the invention is to provide a coil retainer for a core of rotary machines of the laminated core type in which rectangular coil keep members are formed in a channel shape or in such a shape as to have a domed-shaped recess on the surface which comes into contact with turns of insulated coils, thereby increasing mechanical strength of the coil keep members and also increasing the area of the keep members at which they are maintained in contact with the core of rotary machines to improve the magnetic waveform in the gap in the slots and reduce the active air gap.

A further object of the invention is to provide a coil retainer for a core of rotary machines of the laminated core type which comprises a discal coil keep plate formed by using a mixture of magnetized powdered or granular iron with a synthetic resinous material.

Other objects and advantages of the invention will become apparent from consideration of the description set forth hereunder when considered in conjunction with the accompanying drawings.

Brief description of the drawings

In the drawings:
FIG. 1 is an exploded perspective of a laminated core for rotary machines provided with a coil retainer embodying the present invention;
FIG. 2 is a view in section showing modified slots and coil keep plate members of this invention;
FIGS. 3 and 4 are views in section showing modified coil keep plate members of the invention; and
FIG. 5 is a front view of another embodiment of a discal coil keep plate according to this invention.

Description of the preferred embodiments

Preferred embodiments of the invention will now be explained with reference to the drawings.

In the drawings, a core 1 (stator or rotor) made by winding and laminating metal strips in a hollow columnar shape is formed on one side face thereof with slots 2 arranged radially and spaced apart from one another equidistantly for receiving therein turns of insulated coil C (the turns of insulated coil are omitted in FIG. 1 in the interest of clarity). Attached to said core 1 on the other side face thereof is a doughnut-shaped planar supporting member 3 which has a plurality of mounting bolts 5 and 6 attached to portions thereof near the inner and outer walls of the core for removably securing to the iron core a discal coil keep plate 7 presently to be described.

The discal coil keep plate 7 is made of a planar, doughnut-shaped plate 7a shaped such that its inner diameter is smaller than the inner diameter of said core 1 and its outer diameter is larger than the outer diameter of the core 1. The keep plate 7 is formed with substantially segmental openings 7b arranged radially for receiving therein elevated areas 4 of the core 1. Disposed between the adjacent segmental openings 7b, 7b are coil keep plate members 7c, 7c substantially rectangular in shape and adapted to be snugly fitted in the slots 2 of the core 1 to keep in place the turns of insulated coil in the slots 2. The plate 7a is formed at its inner and outer peripheral margins openings 8 and 9 for inserting therein the bolts 5 and 6 attached to the core supporting member 3 and securing by counter-sunk screws 5' and 6' the keep plate 7 in parallel with the side face of the core 1, with the keep plate member 7c being in engagement with the slots 2.

The coil keep plate members 7c is formed of a magnetic material which has good mechanical strength and little iron loss. If the keep plate members 7c are dimensioned such that their width approximates that of the slots 2, it will be possible to reduce pulsation of the magnetic flux in the air gap and also to reduce the so-called active air gap, with a result that a no-load current is reduced, and efficiency and power-factor can be increased.

FIG. 2 is an enlarged sectional view of modified slots 2 and coil keep plate members 7c of this invention in which the side walls of the slots formed in the core 1 diverge outwardly from the bottom toward the top of the slots. It will be seen that opposite walls 21 and 22 of each of the slots diverge outwardly from the bottom toward the top thereof so that the slot has a larger width at the top than in the bottom. Each of the keep plate members 7c is also formed with diverging side faces 72 along its length so that the keep plate members may snugly fit in the slots when the former are indexed with the latter in mounting the keep plate 7 on the iron core 1. If the coil keep plate members 7c are fitted in the slots 2 in such a manner that the side faces of the former are in intimate contact with the diverging side walls of the latter, there will be an increased area of contact between the side walls of the slots and the coil keep plate members 7c and there will be a reduced magnetic reluctance between them. The characteristics provided in the first embodiment is increased in the second embodiment.

FIG. 3 shows another modification of the keep plate members 7c according to the invention in which the keep plate members 7c of the keep plate 7 are formed in the shape of a channel directed downwardly to contact the turns of insulated coils. FIG. 4 shows still another modification of the keep plate members 7c in which the keep plate members 7c are formed with a dome-shaped recess to which the turns of insulated coils are to be brought into contact.

If the keep plate members 7c are shaped as shown in FIGS. 3 and 4, the coil, keep plate 7 will have increased mechanical strength and the space factor of the turns of insulated coil with respect to the slots will be increased. This will result in relieving the turns of insulated coils of excess pressure applied thereto and holding same in place with reduced pulsation of the magnetic flux in the gap, minimizing damage to insulation of the coils.

The modifications of the keep plate members 7c shown in FIGS. 3 and 4 may be formed with diverging side faces as are the case with the keep plate members of FIG. 2. By this arrangement, it is possible to increase characteristics of the open slots of the iron core over and above those of semi-closed slots.

In the present invention, the keep plate members 7c may be made of a mixture of magnetized powdered or granulated iron which has little iron loss and good mechanical strength and a synthetic resinous material, such keep plate members being arranged radially and connected together as a unit by inner and outer annular members 77 and 78 to provide a coil keep plate 7 as shown in FIG. 5, with the keep plate members being fitted in the slots 2 of the core 1.

In connecting the keep plate members 76 together by means of the inner and outer annular members 77 and 78 in the embodiment shown in FIG. 5, engaging portions (not shown) are formed at the inner and outer ends of the keep plate members 7c which are fitted in the slots 2 of the core 1 in which turns of insulated coil are mounted. Then, the inner and outer annular members 77 and 78 formed with engaging portions adapted to engage said engaging portions of the keep plate members are secured to the core 1 by bolts and counter-sunk screws.

Alternatively, the inner and outer ends of the keep plate members 7c may be secured directly to the inner and outer annular members 77 and 78 by a bonding agent, rivets, screws or the like.

The winding keep plate of FIG. 5 may be formed readily and at low cost.

From the foregoing description, it will be appreciated that the present invention provides a coil retainer comprising coil keep plate members connected together as a unit and fitted in slots of a core for positively holding turns of insulated coils in place, thereby eliminating the wedge inserting operation. The present invention provides means whereby turns of insulated coil can be held positively by a simple construction. Since a uniform pressing force is applied from above to the turns of insulated coil mounted in the slots when the coil retainer of this invention is used, there is no danger of damaging insulation of the coil.

The coil keep plate is removably secured to the core by bolts and other means, so that it can be readily attached to and removed from the core. This facilitates repair of the coil. In effecting repair of the coil, there is no danger of damaging or bending turns of coils mounted in the adjacent slots, thereby preventing damage to insulation hereof.

I claim:
1. A coil retainer for a core of rotary machines of the laminated core type comprising coil keep plate members made of a magnetic material of little iron loss and good mechanical strength and connected together at their inner and outer ends to provide a discal coil keep plate, said discal coil keep plate being removably connected by suitable mounting means to one side face of a core of a rotary machine made by winding and laminating metal strips in a hollow columnar shape and formed with slots arranged radially on said core for mounting turns of insulated coil therein, said keep plate members being snugly fitted in said slots so as to keep the turns of insulated coil in place.

2. A coil retainer as defined in claim 1 in which each of said coil keep plate members of the coil keep plate is channel-shaped.

3. A coil retainer as defined in claim 1 in which each of said coil keep plate members of the coil keep plate is formed with a dome-shaped recess on the surface at which the keep plate member is in contact with the turns of insulated coil.

4. A coil retainer as defined in claim 1 in which side walls of each of the slots of the core diverge outwardly from the bottom toward the top of the slot, and each of the coil keep plate members adapted to be fitted in said slot has side faces which also diverge outwardly.

5. A coil retainer as defined in claim 1 in which said coil keep plate comprises a plurality of coil keep plate members arranged radially and connected together as a unit at their inner and outer ends by an inner annular member and an outer annular member.

References Cited

UNITED STATES PATENTS

| 1,605,796 | 11/1926 | Tanzler | 310—268 X |
| 2,557,249 | 6/1951 | Aske | 310—268 X |

WARREN E. RAY, Primary Examiner

U.S. Cl. X.R.

310—254